(12) United States Patent
Bluvband et al.

(10) Patent No.: US 8,229,409 B2
(45) Date of Patent: Jul. 24, 2012

(54) SYSTEM AND METHOD FOR TELEPHONE COMMUNICATION

(75) Inventors: Zigmund Bluvband, Rishon LeZion (IL); Max Bluvband, Rishon LeZion (IL)

(73) Assignee: Silent Communication Ltd., Tel Aviv (IL)

( * ) Notice: Subject to any disclaimer, the term of this patent is extended or adjusted under 35 U.S.C. 154(b) by 218 days.

(21) Appl. No.: 12/527,763

(22) PCT Filed: Feb. 24, 2008

(86) PCT No.: PCT/IL2008/000236
§ 371 (c)(1),
(2), (4) Date: Aug. 19, 2009

(87) PCT Pub. No.: WO2008/102365
PCT Pub. Date: Aug. 28, 2008

(65) Prior Publication Data
US 2010/0093330 A1    Apr. 15, 2010

Related U.S. Application Data

(60) Provisional application No. 60/902,523, filed on Feb. 22, 2007.

(51) Int. Cl.
*H04M 3/42* (2006.01)
(52) U.S. Cl. .......... 455/417; 455/422.1; 455/414.1
(58) Field of Classification Search .......... None
See application file for complete search history.

(56) References Cited

U.S. PATENT DOCUMENTS

| 5,027,384 A | 6/1991 | Morganstein |
| 6,128,485 A * | 10/2000 | Mori et al. ............. 455/422.1 |
| 6,377,795 B1 | 4/2002 | Bach et al. |
| 2003/0095647 A1* | 5/2003 | Cromer et al. ......... 379/102.04 |
| 2004/0002329 A1* | 1/2004 | Bhatia et al. ............. 455/422.1 |
| 2004/0235509 A1* | 11/2004 | Burritt et al. ............. 455/519 |
| 2005/0070286 A1 | 3/2005 | Awasthi et al. |
| 2005/0111646 A1* | 5/2005 | Bishop et al. .......... 379/207.02 |
| 2005/0287994 A1* | 12/2005 | Serafat et al. ............. 455/414.1 |

FOREIGN PATENT DOCUMENTS

| DE | 103 09 579 A1 | 9/2004 |
| EP | 1 267 557 A1 | 12/2002 |

OTHER PUBLICATIONS

Supplementary European Search Report Issued in Corresponding European Application EP 08 71 0236, Dec. 6, 2011.

* cited by examiner

*Primary Examiner* — Erika Gary
(74) *Attorney, Agent, or Firm* — Vladimir Sherman; Professional Patent Solutions

(57) ABSTRACT

The system and method of the present invention may allow a calling party to make a called party to be aware of its intention to establish a call session with it in one or more ways. According to the present invention a calling party may be automatically offered alternatives to voice session or may be allowed to change the silent mode of the called party to a non-silent mode or may be allowed to address a query to a third party via the called party or may be automatically offered to re-establish a connection with a called party if it was disconnected by the called party in error.

1 Claim, 5 Drawing Sheets

SYSTEM AND METHOD FOR TELEPHONE COMMUNICATION

CROSS-REFERENCE TO RELATED APPLICATIONS

This application is a National Phase Application of PCT International Application No. PCT/IL2008/000236, International Filing Date Feb. 24, 2008, entitled "System and Method for Telephone Communication" published on Aug. 28, 2008 as International Publication Number WO 2008/102365 claiming priority of U.S. Provisional Patent Application No. 60/902,523, filed Feb. 22, 2007, all of which are incorporated herein by reference in their entirety.

BACKGROUND OF THE INVENTION

In today's cellular communication networks a large portion of the main revenue stream of the cellular operators is the voice call usage. Nevertheless, more than 40% of the voice calls are not completed. Some of the main reasons for not completing voice calls are "busy tone", network coverage problem, dead battery at the called party, calls waiting, disconnection of the call on Voice Mail message, etc. In these cases, the cellular user, that intended to establish and carry out a voice call conversation with the distant party, is disappointed for not reaching the called party he wishes to reach. Moreover, the calling party is usually not using other options he could use to try and contact the called party he tried to converse with. For these cases, where the calling party at one end tries to reach someone at another end and encounters different problems, there should be a solution that will identify for the calling party at least one other optional method to communicate with the called (or distant) party, depending on the features of the devices at both ends and on the features supported by the communication network. Some methods are known today to enable alternatives for a call that was not established yet, none of them teach the ability automated decision making for the enabling of dynamic continuation of the communication from the caller side according to given scenarios. The prior art's approaches are also limited in their ability to apply triggering from the called party/incoming calls only, without routing a control to the calling party.

SUMMARY OF THE INVENTION

The system and method of the present invention may allow a calling party to make a called party to be aware of its intention to establish a call session with it in one or more ways. According to the present invention a calling party may be automatically offered alternatives to voice session or may be allowed to change the silent mode of the called party to a non-silent mode or may be allowed to address a query to a third party via the called party or may be automatically offered to re-establish a connection with a called party if it was disconnected by the called party in error.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1A:
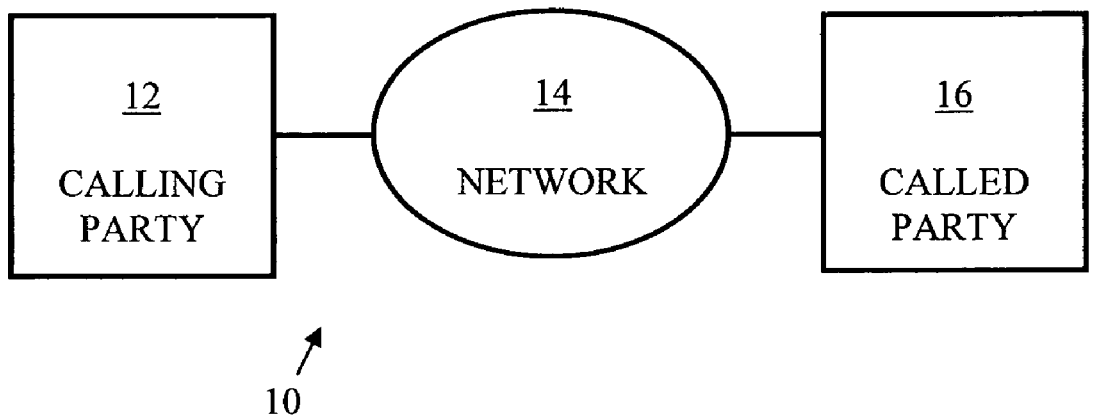
FIGS. 1A and 1B are schematic block diagrams illustrating two embodiments of systems according to the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The present invention discloses method and system for enabling a calling party to better control the situation when a conversation session failed to be established (for example when the calling party is responded with waiting call signal, a no-answer signal, a redirection of the call to answering machine, a busy tone, a 'wrong number' announcement, a 'network difficulty' announcement, etc. For example, in case a calling party calls a called (distant) party phone, such as a mobile (or cellular) phone, and is responded by a 'no answer' signal, and may be even the out going message of the voice mail service has been activated and then the calling party decides not to leave a message. In such a case the system may automatically offer the calling party to use an alternative service for connecting the called party, as will be described in details below. Other case may be when a calling party calls a mobile phone of a called party, and in case the called party is unavailable, such as it is within another communication session and the calling party receives a 'call waiting' signal, once the calling party terminates the intended session, it may be given an option to start an alternative communication link with the called party, as will be described in details below.

Figure 1B:
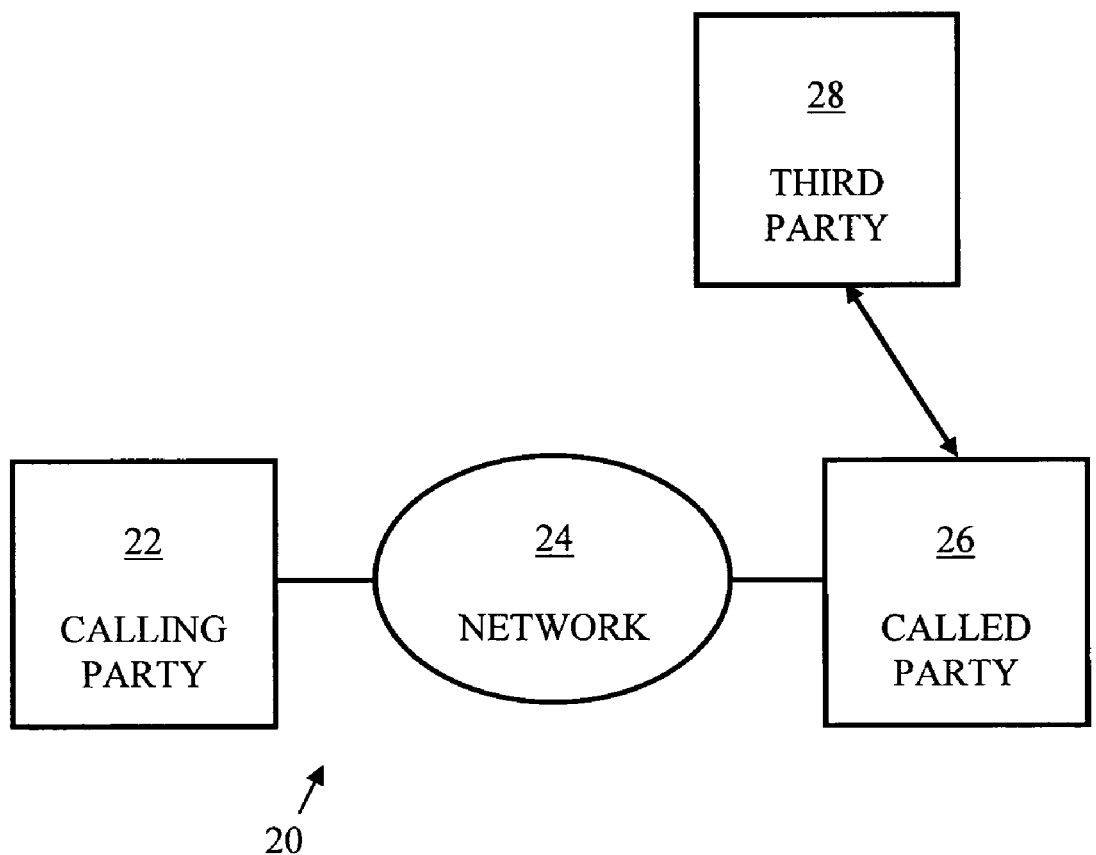

Attention is made to FIGS. 1A and 1B are schematic block diagrams illustrating two embodiments of systems 10 and 20, respectively, according to the present invention. System 10 may comprise a calling party 12 having an active connection to at least called party 16 via communication network 14. Calling party 12, 22 may be a cellular phone, a mobile phone, etc. Called party 16, 26 may be also a cellular phone, a mobile phone, etc. Network 14, 24 may be a cellular network (or more than one cellular network, as the case may be), a mixed network comprising two or more of cellular network, Internet Protocol (IP) based network, landline network, etc. in this application the term network may also comprise a network service provider and options offered by the network and the network service provider, such as signaling, etc. A third party equipment 28 may be any distant equipment being able to connect with called party 26, such as a remote global positioning system (GPS) device, remote equipment that may be activated from remote distance, etc.

Figure 2:
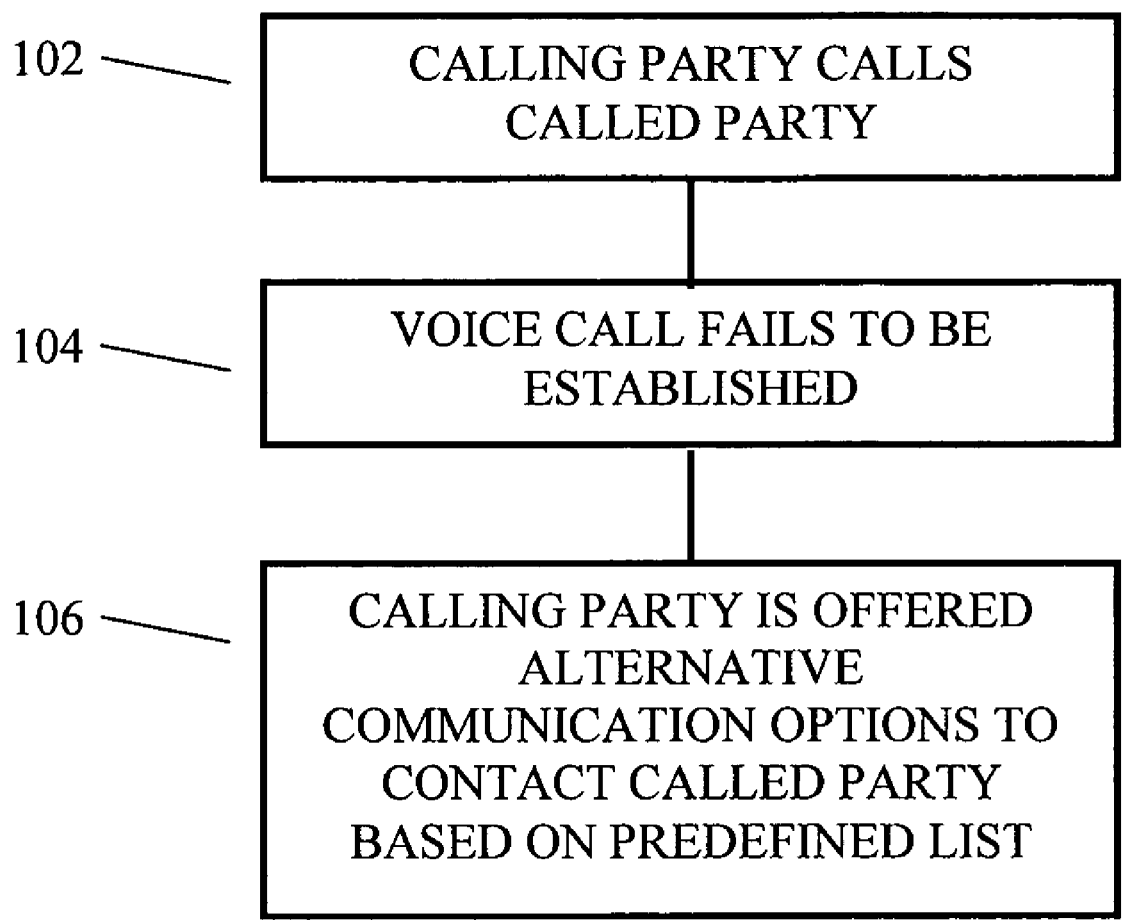
FIG. 2 is a schematic flow diagram illustrating embodiments of the present invention available upon failure to establish voice call.

Attention is made now to FIG. 2, which is a schematic flow diagram illustrating embodiments of the present invention available to a calling party upon failure to establish voice call with a called party. Calling party 12, 22 may try to establish a voice call session with called party 16, 26 (block 102). Calling party 12, 22 may be equipped with a predefined list of alternative communication options with called party 16, 26, such as a short messaging service (SMS), a media messaging service (MMS) and the like. When calling party 12, 22 fails to establish an intended voice call session (block 104), such as when a 'busy tone' is signaled, or a 'call waiting' is signaled; or when called party 16, 26 is disconnected or out of service, etc., the system and method of the present invention may offer calling party 12, 22 alternative communication options to contact called party 16, 26 based on a predefined list (block 106). The signals which are received from called party 16, 26 may symbolize the failure of establishment of a voice call and may activate in calling party 12, 22 a local service which automatically may invoke a menu, or any other manner of presenting options to the called party, which may list some or all of the alternative options for calling party 12, 22 to establish other communication channel with called party 16, 26, such as sending a SMS message, sending a MMS message, calling an alternative phone number (either an associated other cellular number, a landline number, etc.) and the like. This may ease on calling party 12, 22 to establish an alternative communication link with called party 16, 26 when called party 16, 26 is unavailable. The alternative communication links may be saved in a table-like arrangement at calling party 12, 22 or may alternatively be readily saved at one or more of service providers of network 14, 24 or, additionally or alternatively, be saved in a dedicated server connected to and available from network 14, 24.

The contacting details of the alternative communication links may be stored in a 'contacts library' that may be displayed or otherwise suggested to calling party 12, 22, for example using menu driven options that may be invoked automatically when the unavailability of called party 16, 26 has been identified. The contacts library may be constructed with appropriate pointers and indicators between contacts arranged in such a way to allow recommending and/or prioritizing entries in the list in order to start text/voice session called party 16, 26, using the pair-wise comparison method, Saati matrices, voting techniques, historical tracking statistics, etc. As an alternative a fast, real time search in a network such as the Internet or other media may be started, in order to look for and load if found such a list of additional communication channels leading to called party 16, 26 such as phone numbers, 'pointers', 'contacting addresses', etc., that calling party 12, 22 may be interested to use for establishing alternative communication with.

For example, calling party 12, 22 calls called party 16, 26. A voice session is not established and a Voice mail outgoing message is played by called party 16, 26 (or on behalf of called party 16, 26) is sent in response with one of Call waiting/No answer/Busy tone, etc. Calling party 12, 22 is given an opportunity, within a predefined period of time, to select an alternative communication link through a menu-driven offering to start, for example, a text messaging session with called party 16, 26 using, for example, SMS or any other messaging platform. The text session may be established to the same phone number, or to a number associated with called party 16, 26 as listed in the predefined list of alternative communication options described above, or any other number/numbers that may be associated with called party 16, 26.

Figure 3:
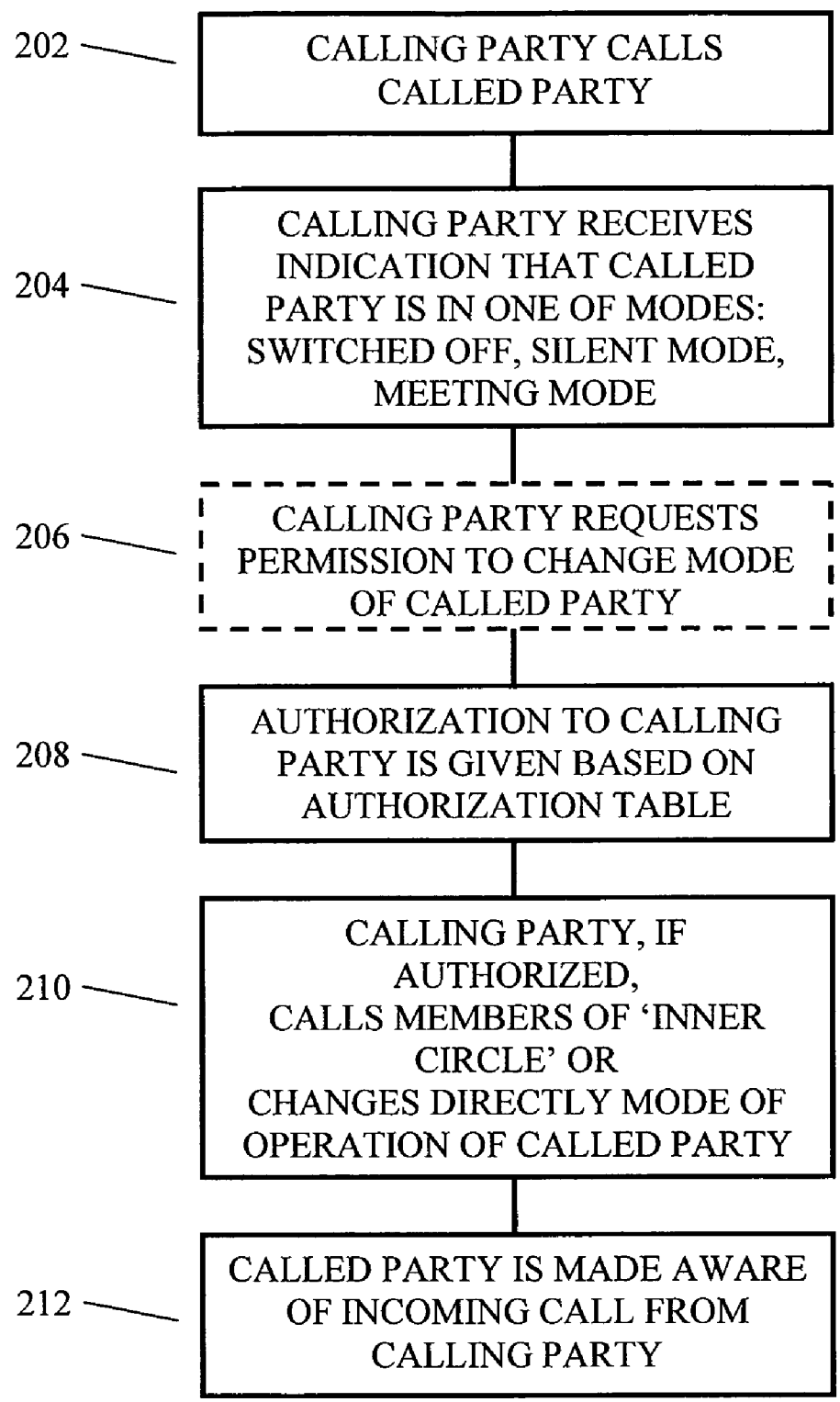
FIG. 3 is a schematic flow diagram illustrating embodiments of the present invention allowing a calling party to change the mode of a called party.

In similar or other situations, one of the common causes for a non-responsive called party is when the called party's phone device has been put in the silent mode (also called 'meeting mode') of operation, when the called party does not hear the ring tone or does not feel the vibration, if the phone device was set in the silent-and-vibrate mode, or if the called party person forgot to enable the light alarm for incoming call when in silent mode, or even when the called party unintentionally turned-off the phone device. Called party 16, 26 may have the feature(s) that may allow a remote party, such as calling party 12, 22, to access called party 16, 26 mode of operation and change it remotely. This feature may require advance permission from called party 16, 26. if called party 16, 26 has given calling party 12, 22 advance permission this may be registered in a table which may be saved with calling party 12, 22 or with called party 16, 26 or with a service provider (not shown) in network 14; 24. Attention is made now to FIG. 3, which is a schematic flow diagram illustrating embodiments of the present invention allowing calling party 12, 22 to change the mode of operation called party 16, 26. Calling party may call called party (block 202) trying to establish a voice session. Calling party 12, 22 may receive: indication from called party 16, 26 that it is in one of the modes switched-off, in silent mode, in vibrate-only mode, in light indication of incoming call, etc. (block 204). Calling party 12, 22 may (optionally) invoke a request from called party 16, 26 to be authorized to change its mode of operation (block 206). The request may be responded with authorization and optionally additional with data, such as a dual tone multi frequency (DTMF) code for activation of the change of mode. The authorization may be based on a table of allowable calling parties which may be saved with called party 16, 26 and/or with a service provider associated with network 14, 24 (block 208). If calling party 12, 22 is authorized it may call one or more of members of relative third party contacts referred to as 'inner circle' with respect to called party 16, 26 which are pre-authorized by called party 16,26 to change its mode of operation. Alternatively or additionally, calling party 12, 22 may be authorized to directly call called party 16, 26 in order to change its mode of operation (block 210) to a more notifyable mode of operation so as to make called party 16, 26 aware of an incoming call (block 212). According to yet another embodiment some calling parties may be authorized to remotely turn ON the phone apparatus of the called party. Typically such calling party are of special, high priority relation with the called party.

Figure 4:
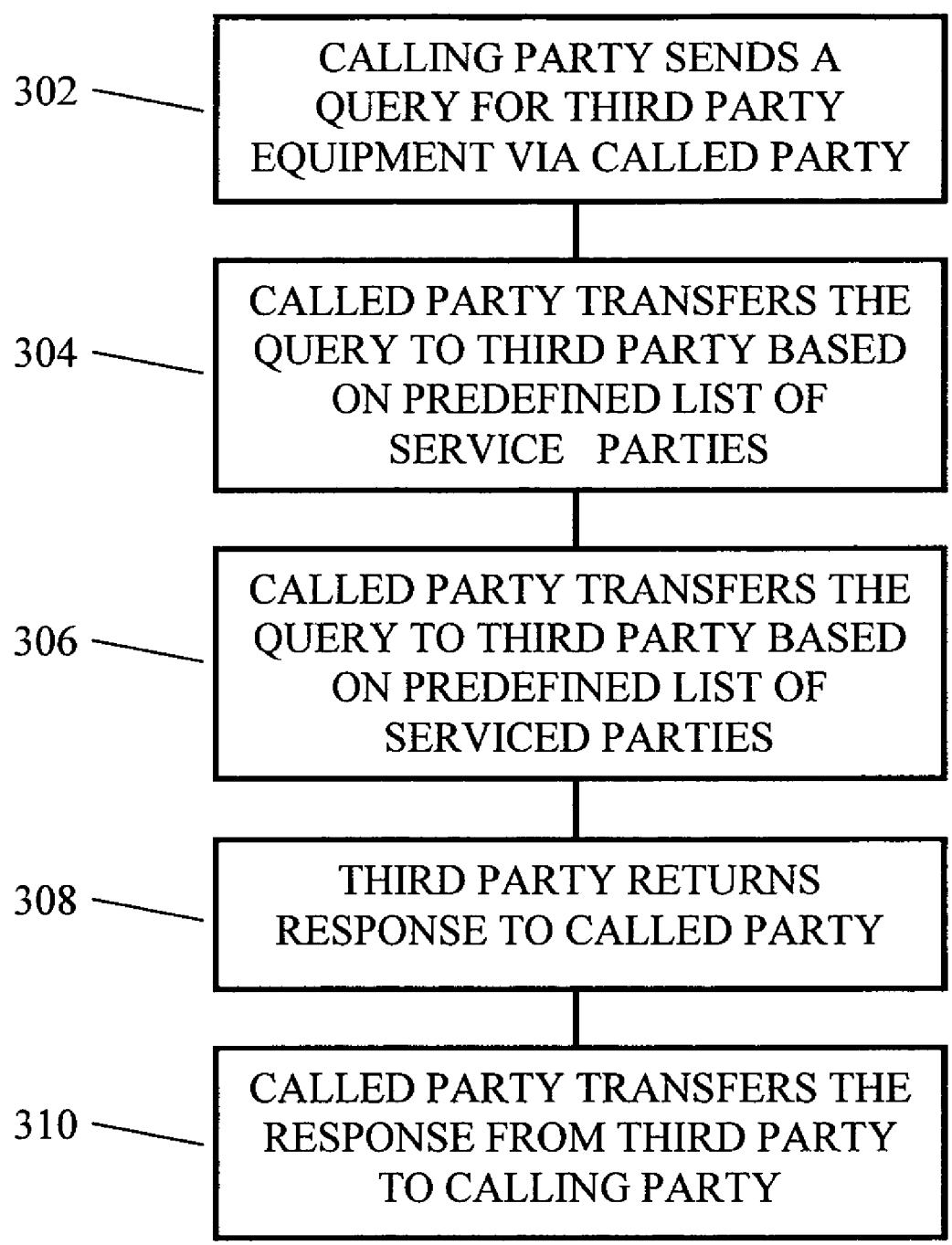
FIG. 4 is a schematic flow diagram illustrating embodiments of the present invention allowing a calling party to query a distant third party via a called party.

In yet additional embodiments a calling party 12, 22 may connect a third party 28 via a called party 16, 26, in order to change its mode of operation and/or to inquire it for status information or for other type of information. Attention is made to FIG. 4, which is a schematic flow diagram illustrating embodiments of the present invention, allowing a calling party 12, 22 to query a distant third party 28 via a called party 16, 26. A call from calling party 12, 22 may be intended to change the status of third party equipment 28 via called party 16, 26. For example, third party 28 may be a GPS device which may not be accessible directly from calling party 12, 22 but may be accessible via called party 16, 26. a call from calling party 12, 22 may be adapted to make called party 16, 26 aware of the incoming call but remains in a silent mode (i.e. no ring tone is heard at called party 16, 26). Additionally, called party may be adapted to interpret the call received from calling party 12, 22 so that it is considered as a signal to be transferred to third party equipment 28 via a local link, such as a Bluetooth® link or similar local link. The transferred signal may be interpreted by third party equipment 28 so as to respond to the query from calling party 12, 22 with status response representing the status of operation of third party 28 or with information, such as location information, or the like. The sending of inquiry to third party equipment 28 and the receiving of response from it may be based on the level of authorization for calling party 12, 22. According to yet additional aspects of the present invention it may be possible to change a mode of operation of an unfound cellular phone device which was lost when in OFF mode, or in a silent mode, so as to turn it ON and/or to change its mode of operation to a non-silent mode.

Figure 5:
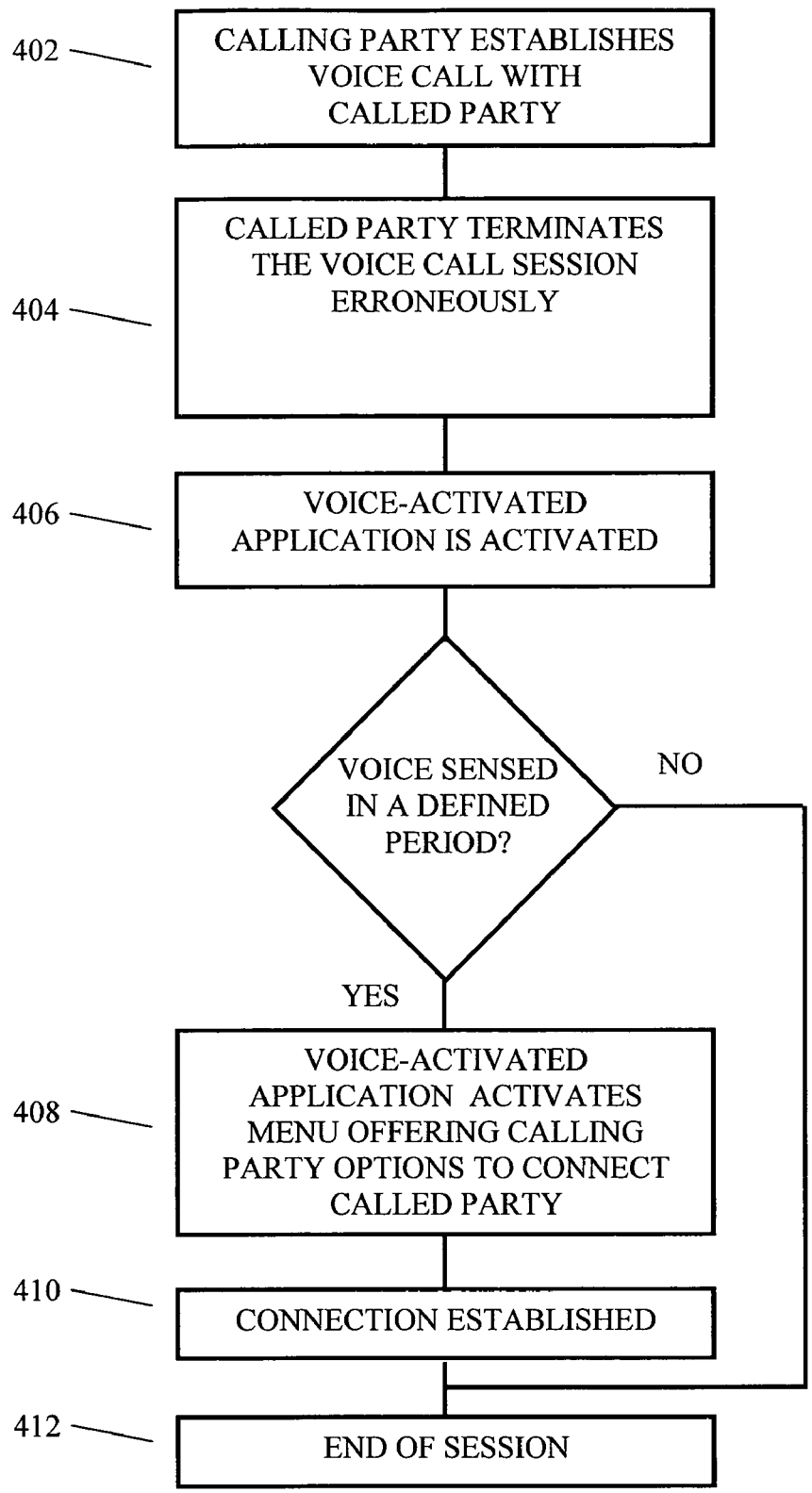
FIG. 5 is a schematic flow diagram illustrating embodiments of the present invention allowing a calling party to re-establish a call with called party upon an erroneous disconnection by the called party.

According to yet another embodiment the menu driven alternative communication options may be activated when a session was terminated but the calling party has not yet finished the session. Attention is made to FIG. 5, which is a schematic flow diagram illustrating embodiments of the present invention allowing a calling party 12, 22 to re-establish a call with called party 16, 26 upon an erroneous disconnection by the called party. When calling party 12, 22 establishes a call with called party 16, 26 (block 402) and called party 16, 26 erroneously disconnects the session prematurely (block 404) a voice-activated application at calling party may be activated (block 406) allowing automatic sensing of an intention to continue the session at calling party 12, 22 end within a specified period of time (block 408). If this intention is identified then the voice activated application may offer calling party 12, 22 alternative options to re-connect called party 16, 26 (block 408) using any alternative available link options, such as dialing for a voice call, sending a SMS and the like. A connection may then be re-established (block 410) and the session may end when calling party and/or called party finds it suitable (block 412). If, however, voice was not sensed within the predefined period of time by voice activated application at calling party 12, 22 then voice activated application at calling party 12, 22 terminates without any additional effect (block 412).

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method comprising:

identifying an erroneous disconnection of a voice session by a first device of a called party;

activating a voice activated application at a second device of a calling party, which voice activated application senses voice at said second device after the disconnection;

activating a function at said second device offering said calling party an option to re-establish connection with said first device if a voice was detected by said application at said second device within a defined period of time after the disconnection;

re-establishing a session with said first device according to selection of said calling party; and ending said re-established session by said calling party or by said called party.

\* \* \* \* \*